United States Patent [19]
Bonfilio

[11] Patent Number: 5,367,920
[45] Date of Patent: Nov. 29, 1994

[54] DAMPED DOUBLE FLYWHEEL FOR A MOTOR VEHICLE

[75] Inventor: Ciriaco Bonfilio, Clichy, Italy

[73] Assignee: Valeo, Paris Cedex, France

[21] Appl. No.: 55,737

[22] Filed: Apr. 30, 1993

[30] Foreign Application Priority Data

Apr. 30, 1993 [FR] France ................... 92 05368

[51] Int. Cl.$^5$ ............... F16F 15/10; F16D 13/50
[52] U.S. Cl. ........................... 74/574; 74/572;
    192/70.27; 192/106.2; 192/70.17
[58] Field of Search ............ 74/572, 574; 132/70.27,
    132/70.29, 70.30, 70.17, 106.2; 464/66, 68

[56] References Cited

U.S. PATENT DOCUMENTS

| | | | |
|---|---|---|---|
| 4,195,719 | 4/1980 | Martinez | 192/89 B |
| 4,989,710 | 2/1991 | Reik et al. | 74/574 X |
| 5,048,658 | 9/1991 | Reik | 192/106.2 |
| 5,097,721 | 3/1992 | Omeyama | 74/572 X |
| 5,111,714 | 5/1992 | Honoki et al. | 192/106.2 X |
| 5,119,693 | 6/1992 | Naudin et al. | 74/574 |
| 5,180,335 | 1/1993 | Maucher et al. | 74/574 X |
| 5,194,044 | 3/1993 | Jackel et al. | 464/68 X |
| 5,209,139 | 5/1993 | Janiszewski | 74/574 |
| 5,261,516 | 11/1993 | Friedmann | 192/70.17 |
| 5,293,978 | 3/1994 | Reik et al. | 464/66 X |

FOREIGN PATENT DOCUMENTS

| | | |
|---|---|---|
| 0270980 | 12/1987 | European Pat. Off. . |
| 2398220 | 2/1979 | France . |
| 2617934 | 1/1983 | France .................... 464/68 |
| 2554891 | 5/1985 | France . |
| 2459274 | 6/1976 | Germany . |
| 2825177 | 12/1979 | Germany .................. 192/70.17 |
| 3901571 | 8/1990 | Germany .................. 74/574 |
| 4020540 | 1/1991 | Germany .................. 74/574 |
| 4117571 | 12/1991 | Germany . |
| 4117584 | 12/1991 | Germany . |
| 4026204 | 2/1992 | Germany . |
| 4118686 | 12/1992 | Germany . |
| 2160296 | 12/1985 | United Kingdom . |

*Primary Examiner*—Vinh T. Luong
*Attorney, Agent, or Firm*—Morgan & Finnegan

[57] ABSTRACT

A damped double flywheel for a motor vehicle forms a modular unit with the associated clutch. The flywheel comprises a first rotating mass having a central hub and secured to the engine crankshaft by securing screws each having a head; a second rotating mass comprising a plate which is typically the clutch reaction plate and which carries an outer hub within it; a torsion damper; and a bearing which is interposed radially between the two hubs. The securing screws lie radially outside the bearing. The outer hub has openings through which the heads of the screws can be fitted, and a removable retaining ring is fitted at the level of these openings, to prevent loss of the screws before assembly to the crankshaft and to enable individual broken screws to be removed if necessary.

9 Claims, 2 Drawing Sheets

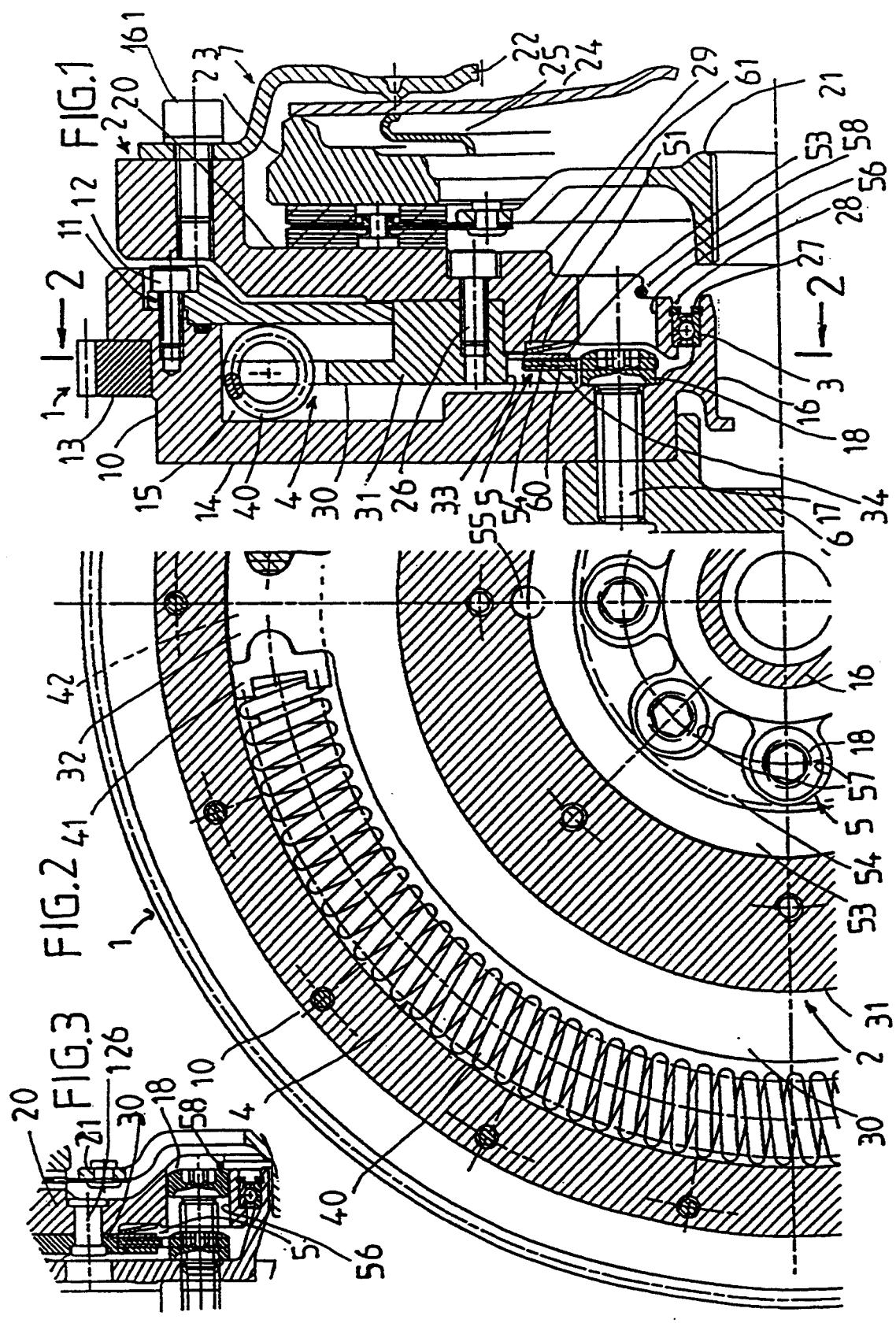

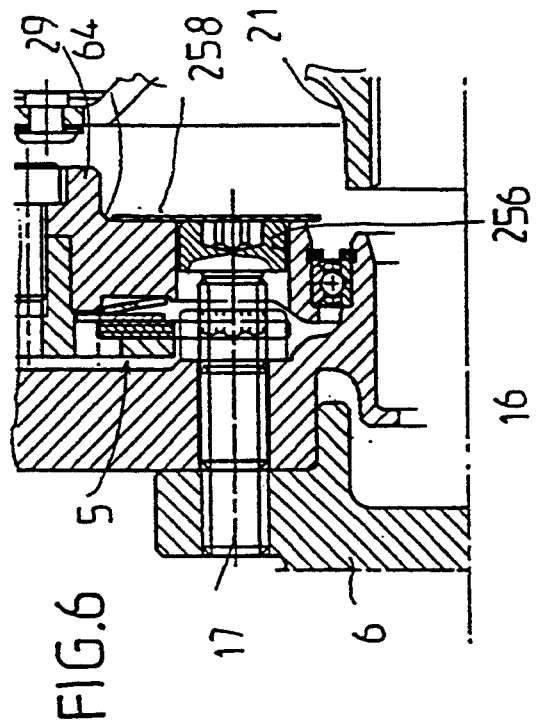
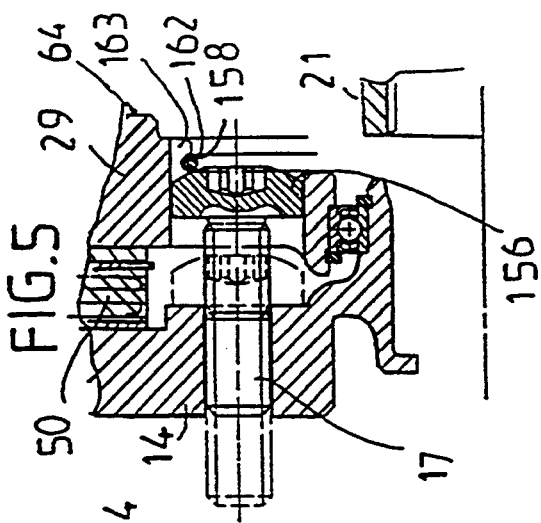
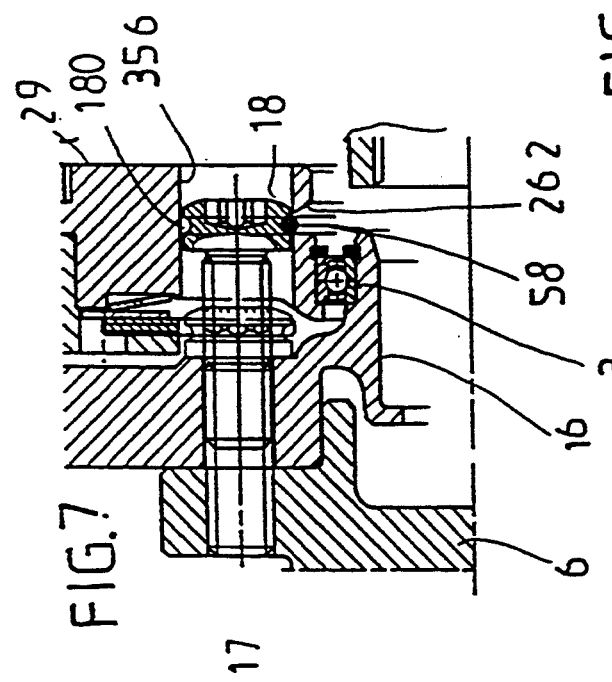
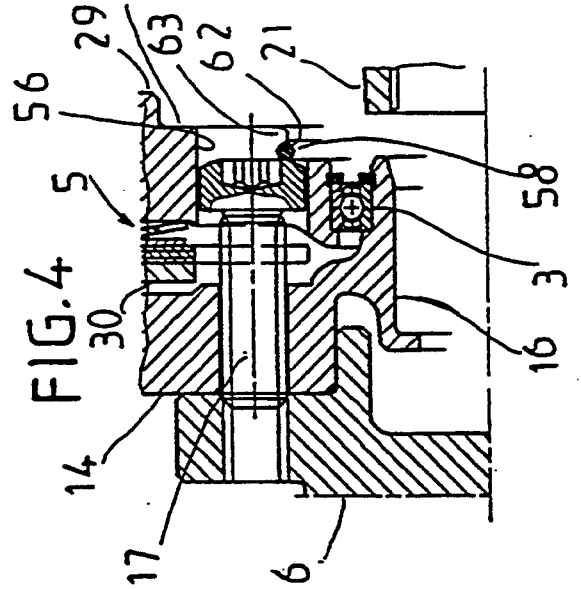

DAMPED DOUBLE FLYWHEEL FOR A MOTOR VEHICLE

FIELD OF THE INVENTION

The present invention relates to damped double flywheels for motor vehicles, of the kind comprising a first mass which includes a central hub, a second mass including a plate which carriers within it a hub (referred to as a second hub), and a circumferentially acting torsion damper which couples the first mass to the said plate of the second mass and which includes a portion which is fixed by securing means to the said plate, and wherein the second mass is mounted for rotation on the first mass through anti-friction bearing means interposed radially between the central hub and the second hub.

BACKGROUND OF THE INVENTION

Such a double flywheel is described in the specification of United Kingdom published patent application GB 2 160 296A. In that document, the torsion damper comprises a disc which extends radially inwardly so as to offer an engagement surface to the anti-friction bearing means. Fastening screws secure the first mass to the crankshaft of the engine.

In practice the screws pass through passages formed in the central hub. As a result, it is not possible to create a module that includes both the double flywheel and its associated clutch. In general terms, it is possible to tighten the screws by gaining access to them through openings formed in the diaphragm of the clutch and through the clutch friction disc or clutch plate; however, the heads of the screws may still come out and escape before the module has been fitted on to the crankshaft.

As is described in the specification of French published patent application FR 2, 554 891A, it is possible to locate the securing screws radially outwards of the anti-friction bearing means, with the second hub then being formed with through openings for passage of the heads of the screws and of a suitable screwdriving tool. In that document, the second hub is surrounded by the central hub. The second hub can also be so designed that it serves as one of the components of the double flywheel, so as to retain the heads of the screws. It is then simplest to provide a shoulder in one of the components of the double flywheel for retaining the heads of the screws. However, this solution is not entirely satisfactory, because if one of the screws breaks during the assembly operation, the whole assembly has to be dismantled.

DISCUSSION OF THE INVENTION

An object of the present invention is to overcome this drawback by providing, in a simple and inexpensive manner, a new arrangement in which, if one of the securing screws breaks, it can be removed without the whole assembly having to be dismantled.

According to the invention, a double flywheel of the type defined under "Field of the Invention" above is characterised in that removable retaining means, carried by the second hub, are fitted at the level of the said openings in the second hub so as to retain the heads of the securing screws, at least in the axial sense going from the first rotatable mass to the said plate of the second rotatable mass, whereby to create a module consisting of the double flywheel and the clutch associated with the plate of the second mass.

Thanks to the invention, if one of the screws happens to break during assembly of the module on to the crankshaft of the engine of the vehicle, that screw can be removed after removal of the retaining means associated with it. It will be appreciated that this arrangement has no detrimental effect on the performance of the damped double flywheel, because the latter can be provided with a friction means which is located mainly radially outside the securing means adjacent to the second hub.

The retaining means may comprise a ring. The latter is preferably retained in a groove so that it cannot escape after the module has been fitted.

According to another feature of the invention, the friction means include a friction ring and a thrust ring, which is subjected to forces exerted by axially acting resilient means for gripping the friction ring between the thrust ring and a friction surface, and the friction ring is so configured at its inner periphery as to mesh loosely, i.e. with a clearance, with the heads of the securing screws.

A component of the torsion damper, fixed to the said plate of the second mass, has an extension which extends towards the axis of the assembly. The axially acting resilient means engage on the said extension, or on a shoulder carried by the outer hub, so as to act on the said thrust ring, while the other one of the two elements comprising the shoulder of the outer hub and the said extension offers the friction surface to the friction ring. These arrangements enable the friction ring to be mounted within the second mass, so as to mesh loosely with the heads of the securing screws.

Thus the friction means are able to act effectively, but are associated with a clearance, and the size of the torsion damper is reduced. This is of particular advantage, especially during large angular displacements between the two rotating masses of the flywheel, and in particular during starting or stopping of the engine of the vehicle when passing through the resonant frequency of the double flywheel. A high friction damping effect is thus provided, while, when the vehicle is travelling, the friction means is inhibited until the clearance between the friction ring and the heads of the securing screws has been taken up. In this way, vibrations can be correctly damped out.

Preferably, in assembly of the flywheel, the above mentioned clearance is so chosen that the friction means does not operate when the vehicle is actually travelling.

It will be appreciated that the assembly is quite short in axial length, and that the securing screws are made use of in the operation of the damper, while advantage is taken of the space which is available radially within the torsion damper.

It will be noted that no force is exerted on the above mentioned plate of the second mass, since the friction means is mounted inside the latter. This arrangement enable the anti-friction bearing means to be made of a reduced zinc, and facilitates the assembly of a clutch module which includes the damped double flywheel with its associated clutch.

Further advantages and features of the invention will appear more clearly on a reading of the description of preferred embodiments of the invention which follows, which is given by way of example only and with reference to the accompanying drawings.

BRIEF DESCRIPTION OF THE DRAWINGS

FIG. 1 is a view in axial cross section showing part of a double damped flywheel in accordance with the invention.

FIG. 2 is a view in cross section taken on the line 2—2 in FIG. 1.

FIG. 3 is a scrap view corresponding to part of FIG. 1 and showing the central part of the double flywheel.

FIG. 4 is a view similar to FIG. 3, and again shows the central part of FIG. 1.

FIG. 5 is similar to FIG. 4, but show a modified embodiment.

FIG. 6 is another view similar to FIG. 4, but shows a different modified embodiment.

FIG. 7 is a once again similar to FIG. 4, but shows a further modified embodiment.

DESCRIPTION OF PREFERRED EMBODIMENTS OF THE INVENTION

The double damped flywheel shown in the drawings is intended for a motor vehicle, and is of the kind comprising a first rotatable mass 1, a second rotatable mass 2, and a circumferentially acting torsion damper 4 coupling the first mass 1 to the second mass 2.

The first mass 1 comprises a central hub 16, while the second mass 2 comprises a plate 20 which carries internally a second, or outer, hub 29 which at least partly surrounds the central hub 16. The torsion damper 4 couples the first mass 1 to the plate 20 of the second mass 2, and comprises a portion 31, which in this example is a fastening portion, which is secured by fixing means 26 to the plate 20. The damper also includes a friction means 5, acting between the first mass 1 and the second mass 2 and comprising a friction ring 54 which is in frictional contact with a friction surface 60. In this example the friction surface 60 is fixed with respect to the second mass 2.

In this double flywheel, the second mass is mounted for rotation on the first mass 1 by means of an anti-friction bearing 3, which is interposed radially between the inner or central hub 16 and the outer hub 29. The friction means 5 also includes a thrust ring 53, on which an axial force is exerted by a resilient means 51 for gripping the friction ring 54 between the thrust ring 53 and the friction surface 60.

More precisely, the first mass 1 comprises a set of generally annular members, namely a hollow housing member 10, 14 which in this example is metal, having a generally radial annular body portion 14 of sealed construction. The hollow housing member also includes an axially oriented flange 10 at the outer periphery of the body portion 14. The first mass 1 also comprises a cover plate 11, and the central hub 16 is also part of the first mass. The cover plate 11 and the housing member 10, 14 together define an annular cavity 15 which is enclosed by them and which is partially filled with grease. To this end, the cover plate 11 is sealing fixed on to the flange 10, in this example by means of screws 12. A sealing ring is shown in heavy lines of FIG. 1 at the joint between the cover plate and the flange 10. A toothed crown 13, which is arranged to be driven in the usual way by the starter of the vehicle, is secured around the flange 10.

The central hub 16 is fixed to the body, or base, portion 14 of the housing member, from which it projects axially. In this example the hub 16 is in fact integral with the housing member 10, 14, which is preferably in the form of a casting. The central hub 16 is tubular in shape and extends axially towards the plate 20, with the outer hub 29 surrounding the central hub 16.

The mass 1 is mounted so as to be rotatable with the internal combustion engine of the motor vehicle, being secured on the crankshaft 6 of the engine by securing screws 17, the heads 18 of which bear on the base portion 14, more particularly on the inner face of the latter which is directed towards the plate 20. These screws 17 thus secure the double flywheel on to a driving part (or driving shaft) of the vehicle in a manner to be described below. To this end, the screws 17 extend through apertures formed in the radial base portion 14 (see FIG. 1 and FIGS. 3 to 7), and are screwed into the crankshaft 6.

The second mass 2 is mounted on the input shaft of the gearbox, through the clutch of the vehicle, so that when the clutch is engaged the second mass 2 is rotatable with the gearbox input shaft. To this end, the plate 20 of the mass 2, which in this example is also a casting, constitutes the reaction plate of the clutch associated with it. A friction disc or clutch plate 21, in this example of rigid construction, is arranged to make frictional contact with the reaction plate 20. The clutch plate 21 is mounted on the input shaft of the gearbox (which is not shown) for rotation with the latter. This gearbox input shaft fits within the central hub 16.

Besides the friction disc 21 and reaction plate 20, the clutch in this example includes a clutch mechanism 7 having a cover plate 22, a pressure plate 23 which is movable in translation with respect to the cover plate 22 and which is coupled to the latter in rotation by means of tangential tongues (not visible), and a clutch diaphragm 24 which bears on the cover plate 22, and which biases the pressure plate 23 towards the reaction plate 20 so as to grip the clutch plate 21.

In the present example the clutch is of the push-off type, that is to say it is of the kind that is disengaged by application of a force on the ends of the fingers of the clutch diaphragm 24 by a clutch release bearing (not shown), so as to cause the diaphragm 24 to deflect and so disengage the clutch. To this end, the diaphragm 24 is in this example mounted for deflection on the cover plate 20, by means of a crown member 25. For more details of this arrangement reference is invited to the specification of French published patent application FR 2 398 220A or the corresponding U.S. Pat. No. 4,195,719. In a modification, the clutch may be of the pull-off type.

In this example, the cover plate 22 of the clutch is secured removably by means of screws 161 on the reaction plate 20, the latter being hollow. The reaction plate 20 partly surrounds the pressure plate 23. The reaction plate 20 may of course be of flat construction, and the clutch cover plate 22 may include an annular skirt portion surroundings the pressure plate 23 and the friction disc or clutch plate 21.

In FIGS. 1 and 2, the securing screws 17 are fitted radially outwardly of the anti-friction bearing means 3. The friction ring 54 is so configured at its inner periphery as to mesh, but with a clearance, with the heads 18 of the securing screws 17. A component 30 of the torsion damper 4, fixed to the plate 20, is formed with an extension 34 which extends radially towards the axis of the assembly. The resilient means 51 of the friction device 5 bear on this extension 34, or on a shoulder carried by the outer hub 29, so as to act on the thrust ring 43; and the other one of the two elements comprising the shoulder of the outer hub 29 and the extension 34 carries the friction surface 60 which cooperates with the friction ring 54. In this way, the friction device 5 is arranged in the interior of the second mass 2, so as to mesh loosely with the heads 18 of the securing screws 17.

This arrangement enables the thickness of the radial body portion 14 of the housing member to be increased in its central part, i.e. at the level of the securing screws 17, as can be seen in FIG. 1. The body portion 14 is thus made extremely robust.

In FIGS. 1 and 2 the friction surface 60 is formed on the member 30, while the outer hub 29 is formed with a shoulder against which the resilient means 51 bear. In this case, this shoulder is defined by the transversely oriented lateral face of the outer hub 29 which faces towards the body portion 14. This face is parallel to the extension 34.

In this example, the member 30 of the torsion damper is in the form of an annular metal damper plate which here forms part of the second mass 2. The damper plate 30 is coupled in rotation to the reaction plate 20, and extends into the cavity 15 in a position laying axially between the base of the cavity, defined by the base portion 14, and the flywheel cover plate 11. The damper plate 30 is fixed to the reaction plate 20, and includes the fastening portion 31 mentioned above (which is generally tubular), secured to the reaction plate 20. The flywheel cover plate 11 extends radially inwards so as to surround the central portion 31 of the damper plate 30 while defining a narrow passage between the plate 11 and portion 31. This passage is narrow enough to prevent escape of grease from the cavity 15.

The damper plate 30 is formed with radial arms 32 (see FIG. 2) for interference with, and engagement on, circumferentially acting resilient means which are part of the torsion damper 4. The means 40 consist in this example of a plurality of coil springs 40, which are very long as can be seen in FIG. 2, and which are fitted between projecting blocks 42 (FIG. 2), which are arranged in facing relationship to each other and which are secured to the flywheel cover plate 11 and the body portion 14, for example by riveting or welding. It should be noted that these blocks 42 are also part of the torsion damper 4, as are the arms 32, and the like the latter the blocks 42 are recessed for cooperation with thrust inserts 41 against which the ends of the springs 40 are engaged.

The springs 40 are mounted in the present example without any clearance between the blocks 42 and the arms 32. However, the springs 40 may of course alternatively be mounted with a clearance with respect to the arms 32, depending on the application. The springs 40 extend around the inner periphery of the flange 10, and are lubricated by the grease in the cavity 15, which increases their useful life.

In the present example the axially acting resilient means 51 comprise a Belleville ring. However in a modification, the resilient means 51 may be in the form of an axially acting corrugated ring, or two Belleville rings. p In the arrangement shown in FIGS. 1 and 2, it is the damper plate 30 which is extended inwardly so as to define the friction surface 60, while the thrust ring 53, which is of reduced size, is coupled in rotation to the securing screws 17 through a mating coupling. The thrust ring 53 is here formed at its inner periphery with slots 57 which are open inwardly and which are annular in shape, with each of these slots cooperating, though with a clearance, with the head 18 of a respective one of the securing screws 17. Thus, as can be clearly seen from FIG. 1, tongues are defined between two consecutive slots 57.

It will be realised that the structure may be modified so that the slots 57 consist of holes having a diameter greater than the diameter of the heads of the screws 17. As shown, these screws are of the hexagon socket type, though they can of course equally well have hexagonal heads.

The friction ring 54 is inserted axially between the thrust ring 53 and the friction surface 60 of the mass 2. The friction device 5 surrounds the central hub 16 but is spaced away from the latter, with the anti-friction bearing means 3 being mounted on the central hub 16. In this example the friction means 3 consist of a single ball bearing having a set of small balls. In a modification the friction means 3 could consist of a bearing having two sets of balls, as in the specification of United Kingdom published patent application GB 2 160 296A; again, a simple bearing of anti-friction material may be used. In every case the bearing means 3 are of small dimensions, and therefore relatively inexpensive.

The bearing 3 is interposed radially between the central hub 16 and the outer (or second) hub 29. The bearing 3 is fixed to the reaction plate 20, and as shown it is in fact integral with the latter. The outer hub 20 is located at the outer periphery of the reaction plate 20, and is shouldered internally so as to fit around the outer ring of the bearing 3, which is engaged in the internal bore of the outer hub 29 and located axially on the latter by means of the above mentioned shoulder and by a ring fastener 28. The fastener 28 (as shown) is a circlip mounted in a groove formed in the internal bore of the outer hub 29.

The bearing 3 is located axially on the central hub 16 partly by means of another circlip 27 fitted in a groove formed on the hub 16, and partly by a shoulder (which can clearly be seen in FIG. 1) defining a local increase in thickness of the hub 16.

In this way, the second mass 2 is located axially on the first mass 1, but is rotatable with respect to the latter through the anti-friction bearing 3.

The friction ring 54 is mounted for free rotation with respect to the thrust ring 53 and friction surface 60. In this example, the friction surface 60 is formed on the damper plate 30, at the inner periphery 34 of the latter, i.e. radially inward of the fastening portion 31. For this purpose, the inner periphery 34 is formed with an annular recess in which the ring 54 is received and centred. The outer periphery of the ring 54 is centred by the external collar portion bounding this recess.

The friction surface 60 is thus defined by the transverse surface of the inner periphery 34 of the damper plate 30 facing towards the outer hub 29, which is also formed with an annular recess facing towards the inner periphery 34 of the damper plate. Thus the two cooperating recesses together define an annular cavity 61, in which the friction device 5 is arranged. It will be appreciated that the recess in the outer hub 29 enables the Belleville ring 51 to be centred.

The friction ring 53 is coupled in rotation to the extension 34 by mating engagement, and has at its outer periphery a plurality of radial lugs 55, which engage in complementary notches 33 formed in the extension 34 at the outer periphery of the friction ring 54. As shown, the lugs 55 and notches 33 are of half-moon section. The notches 33 are formed by drilling through the inward radial extension portion 34 of the damper plate 30 at a point intersecting the shoulder defined by the collar portion of the latter, as can be seen from FIGS. 1 and 2.

It can be seen from FIG. 1 that the friction ring 54 may be of the desired size without being adversely affected by the securing means 26 for the damper plate 30. In this example, these securing means 26 are in the form of screws, the heads of which are engaged in blind holes formed in the reaction plate 20. These screws 26 extend through the base of the blink holes and are screwed into the central portion 31 of the damper plate 30. In a modification, these securing means are in the form of rivets.

It can also be seen that the damper plate 30 extends largely beyond the outer hub 29 in the radial direction, and that the friction device 5 extends radially inwardly of the securing means 26 and also radially inwardly of the fastening portion 31 of the damper plate, which is centred internally by the outer hub 29.

The friction ring 54 is preferably made of a plastics material filled with a suitable particulate material so as to give it the required coefficient of friction. It is also preferably reinforced with fibres such as glass fibres. It can easily be made by moulding.

All of the above arrangements enable the size of the bearing 3 to be reduced, while also constituting a module which comprises the double flywheel with its associated clutch.

As shown in FIGS. 1 and 2, the clutch mechanism 7 is secured by the screws 161 through its cover plate 22. In this connection, having regard to the location of at least the major part of the friction device 5 radially outwardly of the securing screws 17, with the latter being located radially outwardly of the anti-friction bearing 3, the outer hub 29, begin elongated radially as compared with that described in United Kingdom published patent specification GB 2 160 296A, is formed with through openings 56 through which the heads of the screws 17 can pass. Removable retaining means 58, for example a radially resiliently deformable ring, is fitted at the level of these openings. This retaining means is thus carried by the second hub 29, and retains the heads 18 of the screws 17, at least in the axial direction going from the first mass 1 to the plate 10 of the second mass 2, thus creating the module consisting of the double flywheel with the clutch associated with the plate 20 of the second mass 2. The openings 56 extend through the outer hub 29 from one side of the latter to the other, and are in the form of holes which may be of stepped shape as shown in FIGS. 4 and 5 (in FIG. 5 they are indicated by the reference numeral 156). Not only the heads of the screws 17, but also a suitable screwdriving tool, can be passed through these openings.

Referring now to all of FIGS. 1 to 4, the removable ring 58 is resiliently deformable and is interrupted by a gap. It is fitted at the level of the rear lateral face 64 of the outer hub 29. This face 64 faces towards the clutch plate 21 and away from the radial body portion 14 of the first mass 1. The rear face 64 is machined at its inner periphery, within the hole 56, so as to define a collar portion 63 in which a groove 62 is formed, the ring 58 being fitted in this groove 62. The hole 56 is thus stepped axially, so that it consists of an opening which is a hole extended by a slot.

In the modification shown in FIG. 5, the structure is inverted, with the face 64 being machined at its inner periphery outside the stepped opening 156, so as to define a collar portion 163 in which a groove 162 is formed, and in this case the ring (here indicated at 158) is of larger size and is fitted in the groove 162.

Thus in FIG. 4, the retaining ring 58 cooperates with the internal part of the head of the screw 17, while in the arrangement seen in FIG. 5, the ring 158 cooperates with the external part of the heads of the screws 17.

In FIG. 5, the friction device, here shown at 50, is of a modified form, being of the same type as that described in French patent application No. 92 01925, filed on Feb. 20, 1992 and as yet unpublished. It acts in the axial direction between the two masses of the flywheel, being fitted beyond the screws 17. This friction device 50 is in the form of an assembled unit comprising at least one element of resilient material. An overlying friction ring is secured on at least one of the lateral faces of this resilient element for contact with a friction surface which is fixed with respect to the outer hub 29. As shown in FIG. 5, the element of resilient material is overlaid on each of its lateral faces by a respective one of two friction rings, for frictional contact with the body portion 14 and with a component which is fixed to the other hub 29, respectively. This device is mounted under axial precompression between the body portion 14 and the outer portion 29, and is located radially outwards of the securing screws 17.

The element of resilient material is first squeezed, after which a frictional effect takes place. In this way the same effects are obtained as in the embodiment previously described.

In the modification shown in FIG. 6, the removable retaining means, here indicated at 258, comprise an adhered film which overlies the rear face 64 of the opening or hole, 256. In this case, the heads of the screws 17 remain adhered on the film 258 before being fitted on to the crankshaft 6. In the assembly procedure, the film 258 is separated using a screwdriving took, which then drives the screw into the crankshaft 6. By contrast with the embodiments shown in FIGS. 4 and 5, the hole 256 in FIG. 6 is not of stepped form.

A similar arrangement applies in the further embodiment shown in FIG. 7, in which the hole, 356, is associated with a groove 262 which interrupts the internal periphery of the outer hub 29, and which enables access to be obtained to a hole 356 for fitting of the removable retaining rings 58. This groove 262 lies radially outward of the bearing 3, and the head 18 of each screw 17 is preferably formed with a groove 180 for receiving the ring 58. The screws 17 cannot therefore be lost before they are fitted into the crankshaft 6. During assembly, using a suitable screwdriving tool, the resiliently deformable ring 58 is retracted by taking hold of its circumferential gap, so that the screws can then be screwed into the crankshaft 6. This arrangement is particularly simple.

The friction disc 21 also has openings facing towards the openings 56, 156, 256 or 356, and also facing towards the diaphragm 24. All of these openings are in this example axially aligned with each other, and also with the openings formed in the base portion 14 and the threaded holes in the crankshaft 6. Thus, before the screws 17 are secured on the crankshaft 6, the beads of these screws are able to penetrate into the openings 56, 156, 256 or 356, but are prevented from escaping from the latter by the retaining ring 58 or 158, or by the adhesive film 258. The screws are therefore axially trapped between the base portion 14 and the retaining ring or film, which is added after the screws have been inserted into the openings.

In practice, the screws do not project from the base portion 14 (FIG. 5, 6 or 7), or at least they extend only slightly from it as can be seen in the left hand side of FIG. 4. In order to maintain them in this position, the outer face of the base portion 14 (i.e. the face on the left hand side of all the FIGURES except FIG. 2), facing away from the plate 20, can be covered by an adhesive film so as to obturate the openings formed through the base portion 14. This film will be stripped off before assembly, in the same way as the film 258 in FIG. 6. Thus the screws 17 are retained in both axial directions: this is possible because they are quite short. FIGS. 5 to 7 show in broken lines the positions of the screws 17 after they are fitted in to the crankshaft 6.

It will be appreciated that in FIGS. 3 to 5 and FIG. 7, the temporary retaining ring 58 or 158 remains in place after the screws have been secured to the crankshaft, due to the fact that the retaining ring is engaged in a groove.

The embodiment shown in FIG. 5 is preferred to that in FIG. 4, since the ring 158 is less sensitive to centrifugal force. It will also be appreciated that the openings in the outer hub 29 are easy to machine by drilling.

It will be noted that the groove 262 in FIG. 7 has an inclined shape for good penetration of the ring 58, and that the latter is a cranked ring, having an inclined shape which prevents escape of the ring when the double flywheel is fitted on to the crankshaft 6. The diameter of the ring 58 is determined accordingly. Due to the screws 12, 26 and 161, and to the configuration of the damper plate 30, it is possible to fit the securing screws 17 in advance, as well as the friction device 5 or 50. The clutch mechanism 7 is fitted subsequently, with the clutch plate 21 or friction disc being interposed between the reaction plate 20 and pressure plate 23. Using a suitable screwdriving tool, the securing screws 17 are then screwed into the crankshaft 6.

In all cases, if one of the screws 17 breaks while being fitted, the ring 50 or 158 can be removed and the broken screw changed without any need to remove the other screws.

It will be appreciated that securing of the clutch mechanism 7 by means of the screws 61 facilitates formation of the module consisting of the double flywheel and its associated clutch, and enables the clutch mechanism and clutch plate to be dismounted without dismantling of the double damped flywheel.

The double damped flywheel in FIGS. 1 and 2 operates in the following way. When the vehicle first starts to move, the housing member 10, 14 and the flywheel cover plate 11 are displaced circumferentially with respect to the arms 31, so compressing the springs 40 through the end inserts 41 and coupling the first mass 1 of the flywheel resiliently to the reaction plate 20. During this relative displacement of the mass 1 with respect to the mass 2, the friction means 5 are inactive so long as the circumferential clearance between the securing screws 17 and the slots 57 is not taken up. However, after this clearance has been taken up, the friction ring 54 is displaced with respect to the friction surface 60 and the thrust ring 53, by meshing with the screws 17.

During starting or stopping of the engine of the vehicle, the drive train of the latter passes through the resonant frequency of the double flywheel, and a large angular displacement takes place between the first and second masses, with the friction device 5 intervening. Frictional damping is thus obtained.

Thus, by virtue of the arrangement provided by the invention, and the angular clearance (depending on the application) between the heads 18 of the securing screws 17 and the associated slots 57, it is possible to cause the friction means to act over a large angular displacement between the two masses 1 and 2, in such a way that in the slow running mode of the engine, and when the vehicle is travelling, the friction device is inhibited so long as the clearance between the heads 18 and slots 57 has not been taken up. In addition, vibrations can be correctly filtered out.

The above mentioned clearance is preferably so chosen that the friction device does not operate when the vehicle is in motion.

The present invention is of course not limited to the embodiments described above. In particular, the damper plate 30 may be separate from its central portion 31, then serving for securing two radial plates disposed on either side of the damper plate 30. The latter is then gripped between these two radial plates, so that a torque limiter is formed.

One of the radial plates fixed to the plate 20, i.e. the one closest to the base portion 14, is extended radially inwardly so as to define the friction surface 60, with the friction device 5 being confined between the outer hub 29 and this extension of the above mentioned radial plate.

The torsion damper can of course have the same configuration as that described in British patent specification GB 2 160 296A mentioned above.

The various structures can of course be reversed, with the friction ring 54 being in contact with the outer hub while the Belleville ring 51 bears on the extension 34 of the damper plate 30. In a modification, the central portion 31 may be integral with the plate 20, and the outer hub 29 may be carried on the plate 20 by means of suitable fastening screws. The friction device may optionally include two friction rings and two thrust rings.

The damper plate 30 (FIG. 3) may be secured by means of rivets 126 directly on the plate 20, the central portion 31 being then omitted. In that FIGURE, the head 18 of the screws is shown in a withdrawn position. It can be seen that the retaining ring 58 enables subsequent dismantling to be carried out when, for example, one of the screws breaks during its fitting on the crankshaft of the engine. To this end, it is merely necessary to remove the clutch mechanism and to withdraw the retaining ring 58, so that a new screw can be inserted.

Finally, and as shown in FIG. 5, the friction device 50 may take some other form, and be located radially entirely outside the securing screws.

What is claimed is:

1. A damped double flywheel for a motor vehicle having an engine, a driving element coupled to the engine to be driven thereby, and a clutch having a reaction plate and arranged to be driven by said driving element, said double flywheel comprising: a first rotatable mass comprising a central hub and securing screws for securing said first mass to said driving element, each such securing screw having a head; a second rotatable mass comprising the reaction plate of the clutch and a second hub carried internally by the reaction plate; and a circumferentially acting torsion damper coupling said first mass to the second mass through said reaction plate, the torsion damper comprising a fastening portion and securing means securing the fastening portion to the reaction plate, the flywheel further including anti-friction bearing means interposed radially between the central hub and the second hub whereby the second mass is mounted for rotation on the first mass, said securing screws being fitted radially outwardly of said bearing means, the second hub defining transverse openings for passage of the heads of the securing screws and a screwdriving tool therethrough, and wherein the flywheel further includes a plurality of removable retaining means carried by the second hub and fitted at the level of said openings of the second hub for retaining the heads of the securing screws, at least in the axial direction going from the first mass to the reaction plate, whereby the double flywheel and the clutch together form a single module.

2. A double flywheel according to claim 1, wherein the second hub defines a groove at the level of each said opening thereof, and said removable retaining means comprises a plurality of resiliently deformable rings, each held in a respective one of said grooves.

3. A double flywheel according to claim 1, wherein the second hub defines a rear face directed away from the first mass, said removable retaining means being located on said rear face.

4. A double flywheel according to claim 3, wherein the retaining means comprise a film adhered on said rear face and covering the corresponding ends of said openings of the second hub.

5. A double flywheel according to claim 3, wherein said rear face is machined at each said opening so as to define a collar portion of the second hub, with each said collar portion defining a groove for accommodating said retaining ring, whereby said openings are stepped.

6. A double flywheel according to claim 3, wherein the second hub has an inner periphery defining and interrupted by a groove communicating with said openings in the second hub, so as to give access to the latter for fitting of said removable retaining ring.

7. A double flywheel according to claim 6, wherein the head of each said securing screw defines a groove for receiving said removable ring, whereby the screw is held against loss before assembly of the module.

8. A double flywheel according to claim 1, further including a friction means operatively interposed between the two masses of the flywheel, the second hub constituting an outer hub at least partly surrounding the central hub, with said friction means being located at least partly radially outwardly of said securing screws adjacent to said outer hub.

9. A double flywheel according to claim 8, wherein said friction means define a friction surface, and further comprises a friction ring, a thrust ring, and axially acting resilient means for gripping the friction ring between the thrust ring and said friction surface, the friction ring being so configured at its inner periphery as to mesh loosely with the heads of said securing screws, the torsion damper further including a member fixed with respect to the reaction plate and defining an extension extending radially inwardly, the outer hub defining a shoulder, the axially acting resilient means of the friction means bearing on an element selected from said extension and said shoulder for action on said thrust ring, while the other one of said elements defines said friction surface for engagement with the friction ring, so that the friction means is mounted within the second mass for loose meshing with the heads of said securing screws.

* * * * *